(12) United States Patent
Wang

(10) Patent No.: US 8,824,374 B2
(45) Date of Patent: Sep. 2, 2014

(54) CALL SETUP LATENCY OPTIMIZATION FOR LTE TO 1XRTT CIRCUIT SWITCHED FALL BACK

(71) Applicant: Jin Wang, Lisle, IL (US)

(72) Inventor: Jin Wang, Lisle, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 17 days.

(21) Appl. No.: 13/721,248

(22) Filed: Dec. 20, 2012

(65) Prior Publication Data

US 2014/0179318 A1 Jun. 26, 2014

(51) Int. Cl.
*H04W 4/00* (2009.01)
*H04W 76/02* (2009.01)
*H04W 76/06* (2009.01)

(52) U.S. Cl.
CPC .............. *H04W 76/02* (2013.01); *H04W 76/06* (2013.01)
USPC ........... 370/328; 370/329; 370/220; 455/436; 455/404.1

(58) Field of Classification Search
CPC .............................. H04W 76/02; H04W 76/06
USPC ........ 370/328, 329, 220, 331; 455/435, 404.1
See application file for complete search history.

(56) References Cited

U.S. PATENT DOCUMENTS

| 2011/0149853 | A1* | 6/2011 | Olsson et al. ................ 370/328 |
| 2012/0014345 | A1* | 1/2012 | Faurie et al. ................ 370/329 |
| 2012/0108197 | A1* | 5/2012 | Uchiyama et al. ......... 455/404.1 |
| 2012/0120789 | A1* | 5/2012 | Ramachandran et al. .... 370/220 |
| 2013/0070728 | A1* | 3/2013 | Umatt et al. ................ 370/331 |
| 2013/0217393 | A1* | 8/2013 | Nishida et al. ............. 455/436 |
| 2014/0003348 | A1* | 1/2014 | Velev et al. ................. 370/328 |

* cited by examiner

*Primary Examiner* — David Q Nguyen
(74) *Attorney, Agent, or Firm* — Carmen Patti Law Group, LLC

(57) ABSTRACT

A method and apparatus for reducing call setup latency in an LTE network is disclosed. Services in a 1xRTT network are provided for both single receiver (SRx) and Dual Receiver (DRx) User Equipment using CSFB (Circuit Switched Fall Back). When an idle UE requests a CSFB to 1xRTT service and related PS (packet service) Suspension in the LTE network, an eNB can reduce or eliminate the exchange of RCC (Radio Resource Control) messages with the UE before UE is redirected to 1xRTT for CSFB service. Eliminating unnecessary messages reduces call setup latency. The number of exchanged messages can be reduced when the eNB broadcasts an indicator that the eNB supports CSFB and an MME (Mobility Management Entity) sends a message to the eNB indicating that a UE is requesting CSFB.

20 Claims, 4 Drawing Sheets

CALL SETUP LATENCY OPTIMIZATION FOR LTE TO 1XRTT CIRCUIT SWITCHED FALL BACK

FIELD OF THE INVENTION

The invention relates generally to wireless networks and more particularly to providing 1xRTT voice services in a LTE (Long Term Evolution) network by means of Circuit Switch Fallback (CSFB).

BACKGROUND

Wireless networks are currently transitioning from an architecture referred to as Third Generation (3G) to Fourth Generation (4G) architecture, commonly known as LTE (Long Term Evolution). The 3G architecture offers packet data services with transmission speeds lower than LTE. For voice calls, a voice-centric call processing technology called 1xRTT (single carrier Radio Transmission Technology) is used which is often referred to as 2.5G.

The transition to LTE can be uneven and take time due to the fact that mobile devices (commonly called UEs for User Equipment) and LTE network equipment do not yet support commercial-grade VoLTE (voice over LTE) for voice service. Thus, even if a network provider chooses to upgrade its equipment to implement a LTE network for higher-speed packet data services, it must also be able to provide voice service to any UEs that enter its service coverage area. In addition, the network provider must continue to provide existing service to LTE devices that want to send or receive calls from 2.5G/3G devices or take advantage of other 3G services.

Since the transition from 3G to LTE may take years, there are a variety of efforts underway to make it as seamless as possible for end users of mobile devices, as well as cost effective for network providers. Some UEs are designed with two receivers, one for exchanging signals with a 2.5G/3G network and the other for exchanging signals with an LTE network. These UEs are referred to as Dual-Receiver (DRx) UEs. One downside for this solution, however, is potential negative impact on UE battery life caused by the simultaneous operation of two receivers in certain scenarios. Thus, the same or other UE manufacturers have also designed Single Receiver (SRx) UEs for potentially reduced cost of goods and improved UE battery life. However, these UEs are not able to interact with both 2.5G/3G and 4G networks at the same time.

On the network side, LTE network equipment such as MMEs (Mobility Management Entity) and eNBs (eNodeB) must be able to interact effectively with 2.5G/3G network equipment like MSCs (Mobile Switching Center) and SGWs (Serving Gateway). One technique for providing this interaction is commonly called Circuit Switched Fallback (CSFB). CSFB provides a mechanism for connecting calls between 1xRTT and LTE UEs via a combination of 2.5G/3G and LTE network equipment. A solution for SRx UEs commonly referred to as an 'S102 Interface based' is shown in FIG. 1. In this figure, a UE equipped with CSFB capabilities is shown at 102. It is connected to E-UTRAN (eNB) 104 which is further connected to MME 106 and Serving/PDN Gateway 108. The S102 interface is provided between MME 106 and 1xCS IWS (Inter-working Server) 110, which provides the connection to and interoperability with 1xRTT MSC 112. This solution uses interaction between an MME and an MSC using an IWS. Thus, it requires much higher upfront expenditures and has not been deployed by all major network providers.

The overlap and interaction of 2.5G/3G and LTE network equipment can cause performance problems with regard to unnecessary and duplicate processing which increases end-to-end voice call setup latency for the end user. In addition, current solutions for SRx UEs are expensive and not deployed by some major service providers. Therefore, what is needed is a procedure whereby both DRx and SRx UEs attached to LTE network can access the 1xRTT network with reduced call setup latency.

SUMMARY

Embodiments of the present invention disclose a method and apparatus for reducing the number of messages exchanged between network elements, and therefore reducing call setup latency, when an idle UE requests a CSFB to 1xRTT service.

In one embodiment, there is provided a method for reducing call setup latency in an LTE network including the steps of broadcasting an indicator that an eNB supports Circuit Switched Fall Back (CSFB) for dual receiver user equipment (DRx UE), receiving a message requesting connection to a voice-centric call processing network from a user equipment (UE), the message comprising a payload including at least a CSFB indicator, forwarding the payload to a mobility management entity (MME), receiving, from the MME, a request message that comprises the CSFB indicator, sending a connection release to the UE without exchanging any further messages with the UE and returning a UE Context Release Request to the MME with an indicator that the UE is accessing the voice-centric call processing network, without sending an expected response message in response to the request message from the MME.

In another embodiment, there is provided a method for reducing call setup latency in an LTE network, said method executed by an eNodeB (eNB) and including the steps of broadcasting an indicator that the eNB supports CSFB for dual receiver UEs, receiving an Uplink (UL) Info Transfer message requesting connection to a 1xRTT network from a user equipment (UE), the message comprising a payload including at least a CSFB indicator, forwarding the payload to a mobility management entity (MME) in a Initial UE Message, receiving, from the MME, an Initial Context Setup Request that comprises at least the CSFB indicator and optional UE capability information, sending a Radio Resource Control (RRC) Connection Release to the UE without exchanging any further messages with the UE and returning a UE Context Release Request to the MME with an indicator that the UE is redirected toward 1xRTT, without replying with an Initial Context Setup Response or Initial Context Setup Failure to the MME in response to the Initial Context Setup Request from the MME.

Some embodiments of any of the above methods further include wherein the voice-centric call processing technology is 1xRTT.

Some embodiments of any of the above methods further include wherein the method steps are executed by the eNB.

Some embodiments of any of the above methods further include the step, executed by the MME, of performing PS (Packet Service) Suspension in response to the UE Context Release Request.

Some embodiments of any of the above methods further include wherein the message from the MME is an Initial Context Setup Request and further comprises a field for ueCapabilityInfo.

Some embodiments of any of the above methods further include wherein the UE is a SRx (Single Receiver) UE.

Some embodiments of any of the above methods further include wherein the UE is a DRx (Dual-Receiver) UE.

Some embodiments of any of the above methods further include the step of providing Per Call Measurement Data (PCMD) to the MME.

In another embodiment, there is provided an apparatus for use in an LTE network for reducing call setup latency using an eNB, the apparatus configured to perform the steps of broadcasting an indicator that an eNB supports Circuit Switched Fall Back (CSFB) for dual receiver user equipment (DRx UE), receiving a message requesting connection to a voice-centric call processing network from a user equipment (UE), the message comprising a payload including at least a CSFB indicator, forwarding the payload to a mobility management entity (MME), receiving, from the MME, a request message that comprises the CSFB indicator, sending a connection release to the UE without exchanging any further messages with the UE and returning a UE Context Release Request to the MME with an indicator that the UE is accessing to the voice-centric call processing network, without sending an expected response message in response to the request message from the MME.

Some embodiments of the above apparatus further include wherein the voice-centric call processing technology is 1xRTT.

Some embodiments of the above apparatus further include wherein the method steps are executed by the eNB.

Some embodiments of the above apparatus further include the step, executed by the MME, of performing PS (Packet Service) Suspension in response to the UE Context Release Request.

Some embodiments of the above apparatus further include wherein the message from the MME is an Initial Context Setup Request and further comprises a field for ueCapabilityInfo.

Some embodiments of the above apparatus further include wherein the UE is a SRx (Single Receiver) UE.

Some embodiments of the above apparatus further include wherein the UE is a DRx (Dual Receiver) UE.

Some embodiments of the above apparatus further include further comprising the step of providing Per Call Measurement Data (PCMD) to the MME.

DESCRIPTION OF THE DRAWINGS

Features of example implementations of the invention will become apparent from the description, the claims, and the accompanying drawings in which:

DETAILED DESCRIPTION

Figure 1:
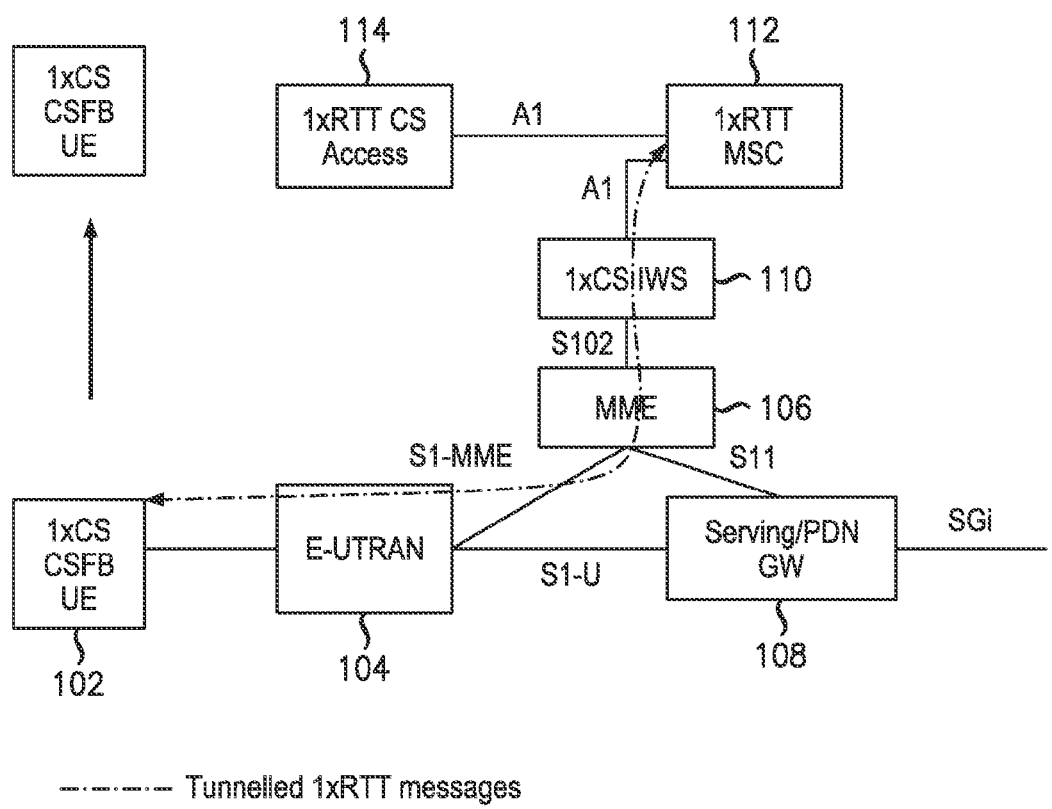
FIG. 1 is a block diagram illustrating a prior art architecture for implementing CSFB for single receiver UEs (SRx UEs).

Wireless networks around the world are in the process of updating from second and third generation (3G) networks to Long Term Evolution (LTE, also known as 4G) networks. The radio access part of the LTE networks is referred to as E-UTRAN (Evolved UMTS Terrestrial Radio Access Network) or eNodeB. In general, the 3G network supports packet data services with transmission speeds lower than LTE and the 2G network is circuit switched, or voice-centric using a protocol referred to as 1xRTT. LTE networks are packet switched, or data-based, and voice services can be offered via a technology known as Voice over LTE (VoLTE). Until LTE networks and user equipment are fully implemented to support commercial-grade VoLTE, the network must be capable of allowing user equipment (UE) attached to the LTE network to have voice service and access other CS-domain (Circuit Switched) services by reusing the 1xRTT infrastructure and Circuit-Switched Fall Back (CSFB) procedures.

CSFB for 1xRTT (abbreviated as 1xCSFB) enables the delivery of CS-domain services by reusing the 1xRTT infrastructure when a UE is attached to LTE. A UE which is enabled with CSFB can, while connected to E-UTRAN, register in the 1xRTT domain in order to use 1xRTT access to establish one or more CS services.

1xCSFB may be used for both DRx and SRx UEs, although the process used by each is very different. DRx UEs are able to camp in 1xRTT while they are active in E-UTRAN, however, they may not be able to stay in E-UTRAN when they handle a CS call or access other services in 1xRTT if the UE has a single transmitter (single Tx and two Rx). When the UE leaves LTE for 1xCSFB, it is important that the UE informs the LTE network so that LTE can perform PS Suspension to avoid unnecessary paging to the UE.

DRx UE

In operation, an eNB broadcasts information used by UEs to attach to the network and register their location, among other things. In a network that implements CSFB, part of the information broadcast by eNBs in SIB8 (System Info Block type 8) is a field indicating that the eNB is able to support 1xCSFB for DRx UEs.

When a user chooses to access a voice or circuit-switched 1xRTT service while E-UTRAN attached, there are two situations in which 1xCSFB may be triggered. In a first case, the user requests 1xCSFB while the UE is actively connected to E-UTRAN, for example, downloading or transmitting data. In a second case, the user requests 1xCSFB while in idle mode. An eNB automatically transitions a connected UE to idle mode if the UE stops sending and receiving traffic for some interval known as Inactivity Timer. As a result the second case of an idle UE requesting 1xCSFB tends to be the dominating situation and thus it is critical that its call setup latency is optimized such that it is equal to or better than the counterpart of a native CS call setup on the 1xRTT network.

Current standards supporting 1xCSFB for Dual Rx UEs require exchanging a full set of RRC (Radio Resource Control) messages between an eNB and the UE and between eNB and MME before the UE can start 1xRTT voice call setup. These messages add to the call setup latency and increase the likelihood that failures will be improperly or misleadingly logged.

Figure 2:
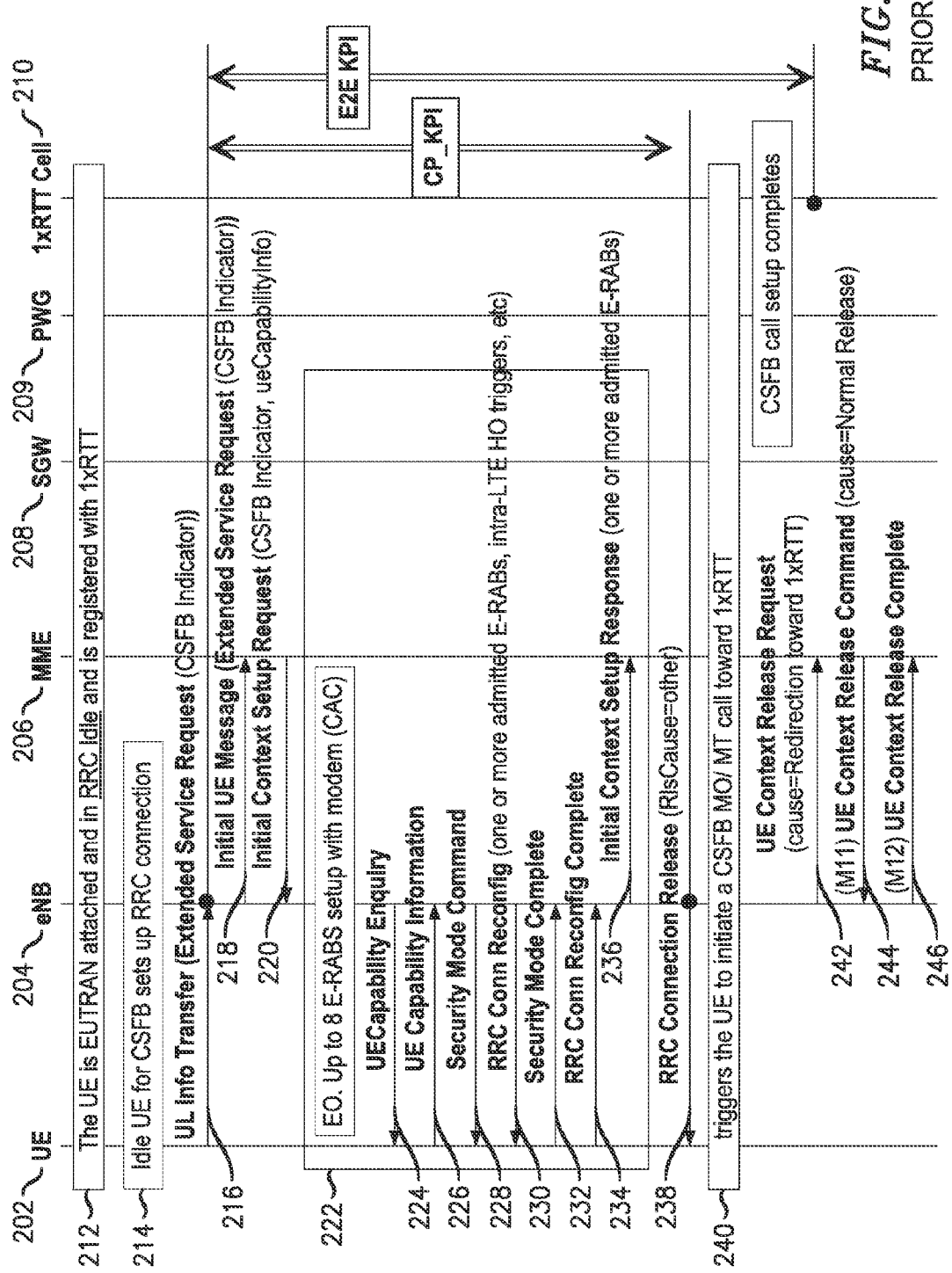
FIG. 2 is a diagram illustrating a callflow of a prior art technique for providing CSFB for dual-receiver UEs (DRx UEs), which does not use the S102 interface.

The prior art standards for 1xCSFB for DRx UEs is depicted in FIG. 2. This diagram illustrates a callflow primarily between a UE 202, eNB 204 and MME 206. Serving Gateway (SGW) 208, Public Data Network Gateway (PGW) 209 and 1xRTT Cell 210 are also shown.

At 212, the initial condition for this callflow is depicted: UE 202 is attached to E-UTRAN, registered with the 1xRTT and is currently in RRC Idle. This means that the UE is not actively transmitting any user traffic.

At step 214, UE 202 sets up an RRC connection in order to request the LTE network to perform PS Suspension for the UE. This step involves a number of messages between UE and eNB that are not critical to the invention.

At step 216, UE 202 sends an Extended Service Request with a CSFB indicator to eNB 204 as the payload of a UL Info Transfer message. This NAS message is transparently forwarded by eNB 204 to MME 206 at step 218. The eNB forwards the Extended Service Request as the payload of an Initial UE Message without examining the payload because it is a NAS (Non-Access Stratum) message between UE and MME and NAS messages passing through eNB are not looked at or analyzed by eNB as per the LTE standards. Thus, eNB 204 is unaware that UE 202 has requested CSFB service at this point.

In response to the message, MME 206 exchanges several messages with SGW/PGW 208 to allocate resources for the call request (not shown). Then, in step 220, MME 206 sends an Initial Context Setup Request to eNB 204. This request includes the CSFB indicator from the Extended Service Request as well as an optional ueCapabilityInfo. Message 220 also tells eNB 204 that it needs to allocate certain radio resources for the UE, e.g. up to 8 E-RABs (E-UTRAN Radio Access Bearer) for the UE and that it needs to perform call and admission control (CAC) for the UE.

Box 222 includes messages exchanged by eNB 204 and UE 202 in response to an Initial Context Setup Request from MME 206 according to the prior art standards. These messages include UECapability Enquiry in step 224 and UECapability Information in step 226. These messages are optional depending on the presence of ueCapabilityInfo in the message from MME 206 in step 220.

Next, eNB 204 sends a Security Mode Command to UE 202 in step 228 and a RRC Connection Reconfiguration message in step 230. The Security Mode Command deals with encryption and fraud protection, for example. The RRC Conn Reconfiguration message contains information about the number and type of E-RABs to be allocated by the UE and mobility measurements and triggers to be used by the UE, etc. At steps 232 and 234, UE 202 responds to these messages with Security Mode Complete and RRC Conn Reconfiguration Complete. In step 236, eNB 204 responds to Initial Context Setup Request 220 with an Initial Context Setup Response message if everything at eNB and between eNB and UE goes well.

The eNB 204 then sends a RRC Connection Release message to UE 202 at step 238 which causes the UE to initiate a CSFB call to the 1xRTT network at step 240. After step 238 eNB 204 sends UE Context Released Request (with cause set to "Redirection toward 1xRTT") to MME 206 at step 242. This cause value in the message triggers MME 206 to send a Packet Service (PS) "Suspend Notification" to SGW 208, which sends the indication to PGW 209 so that PGW 209 will no longer send UE-terminated traffic to SGW. Note that in the absence of the PS Suspension triggered by the UE, UE-terminated traffic would result in SGW sending messages to MME, which in turn sends messages to a cluster of eNBs within the UE's tracking area(s), which in turn page the UE. The paging is unnecessary and a waste of LTE resources since the UE is already re-tuned to 1xRTT for the CS voice call.

Finally in step 244, MME 206 sends eNB 204 a UE Context Release Command (cause=Normal Release). The eNB 204 responds at step 246 with a UE Context Release Complete message.

Steps 224-236 in box 222 all add to the call setup latency time in their execution time alone, as well as the increased potential for failure or time-out conditions at any of these steps.

As shown in FIG. 2, when MME 206 sends an Initial Context Setup Request with CSFB Indicator to an eNB, it typically expects in return either Initial Context Setup Response if everything goes well at the eNB and between eNB and UE; or, in the alternative, Initial Context Setup Failure if something went wrong. Additionally, in the prior art, an eNB receiving an Initial Context Setup Request typically executes the steps in box 222 of FIG. 2. This increases call setup latency as explained above.

Figure 3:
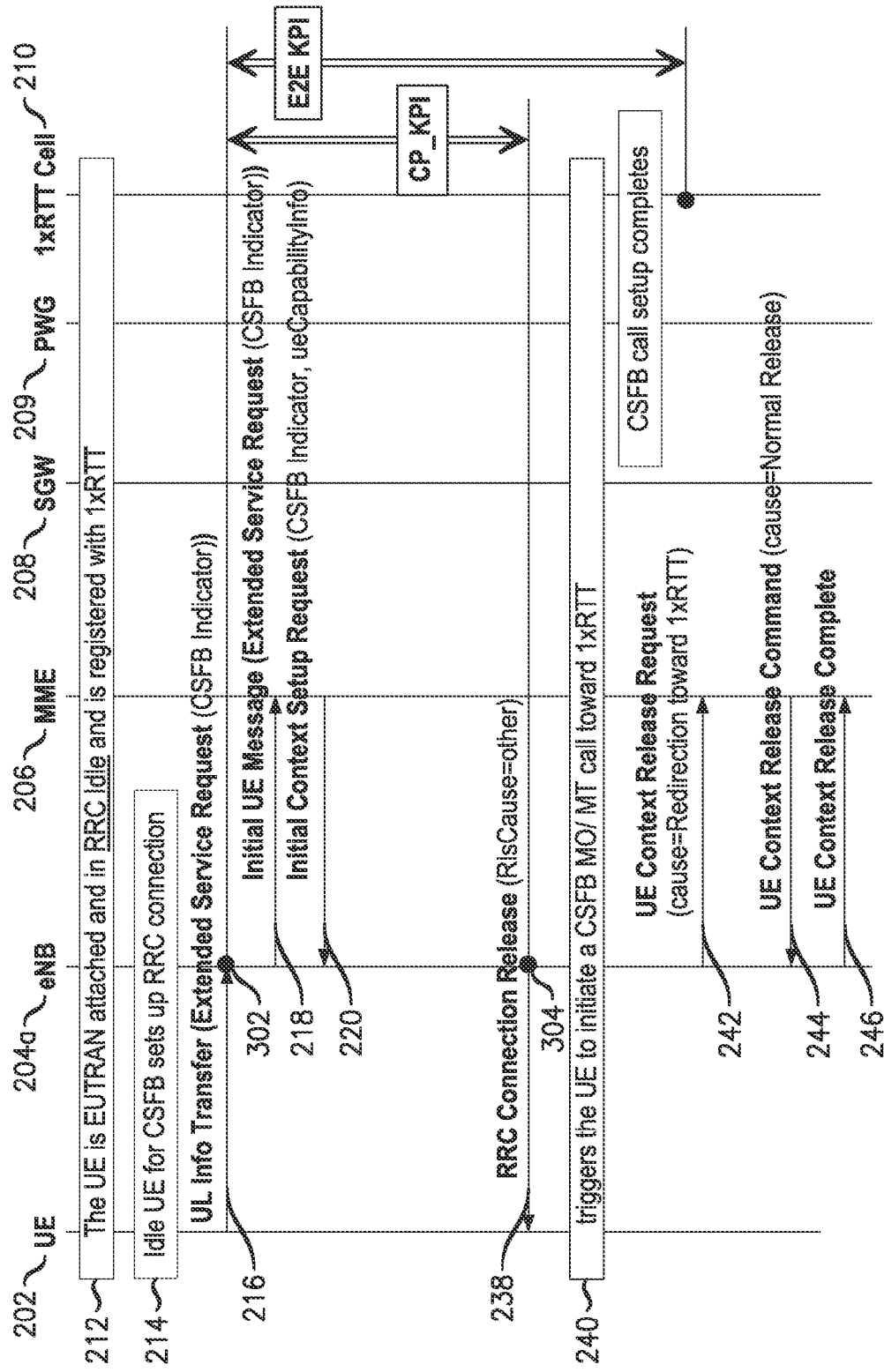
FIG. 3 is a diagram illustrating a callflow of the inventive technique for providing CSFB for both DRx and SRx UEs, which does not use the S102 interface.

In a first embodiment, the invention comprises an alternate callflow that reduces this call setup latency time as depicted in FIG. 3. Elements that are common between FIG. 2 and FIG. 3 have the same reference numbers. The callflow in FIG. 3 takes advantage of the fact that MME 206 can also handle certain race condition where an eNB sends the UE Context Release Request message after reception of the Initial Context Setup Request but before responding with an Initial Context Setup Response or Failure. The situation can arise, for example, when eNB 204a experiences a RLF (Radio Link Failure) or other rainy-day scenarios during Initial Context Setup Request processing. When MME 206 receives a UE Context Release Request after sending an Initial Context Setup Request, it can check for the presence/absence of a CSFB Indicator in the Initial Context Setup Request and the cause value in the UE Context Release Request to determine that triggering of PS Suspension is needed for the 1xCSFB requesting UE.

One important feature of this embodiment concerns the PCMD (Per Call Measurement Data). PCMD will record the UE type (e.g. UE has dual receivers), a timestamp 302 that eNB has received the message in step 216, and a timestamp 304 that eNB has processed the message in step 238, and other fields relevant for the UE's call. The difference between the two timestamps provides the eNB contribution to the 1xCSFB call setup delay. The PCMD info can be stored locally at the eNB and periodically transported to an OA&M (Operations, Administration and Management) network element for post processing. Or alternatively sent to MME from eNB right after step 246 via a "private S1-MME" message extension for post processing.

In an alternative embodiment, if the CSFB indicator feature is enabled but a configurable flag for 1xCSFB call setup latency optimization is disabled, in other words, if the MME is known to be unable to support receiving a UE Context Release Request after it has sent an Initial Context Setup Request and before receiving UE Context Setup Response/Failure, then the eNB defaults to performing the steps in box 222 of FIG. 2.

SRx UE.

In theory, SRx UEs should follow a different callflow that makes use of the S102 interface between MME and IWS/1xRTT MSC. In practice, not all major CDMA service providers plan to deploy this more complex and high-cost solution. If idle SRx UEs trying to make 1xCSFB calls simply leave LTE and re-tune to 1xRTT without attempting to trigger PS suspension actions in the LTE network, unnecessary paging and waste of LTE resources will happen while the UEs are away from the LTE for 1xCSFB calls. This problem can be solved if SRx UEs would just follow the DRx UEs 1xCSFB callflow depicted in the prior art FIG. 2 despite of the fact the 3GPP callflow is meant for DRx UEs.

Thus the prior-art callflow described above (i.e. FIG. 2) can also be used for SRx UEs; as such another embodiment of the invention is that the same FIG. 3 applies to SRx UEs for this type of UEs to obtain the same benefit of 1xCSFB call setup latency optimization. The differences and similarities with respect to DRx UEs are as follows. First, if the optional ueCapabilityInfo is present in the Initial Context Setup Request 220 from MME 206 and the relevant sub-fields within the ueCapabilityInfo indicate that the UE is indeed a SRx UE rather than DRx UE, the eNB still skips steps 224 to 236 and performs step 238 right away (sending RRC Connection Release to the UE), followed by step 242 (sending UE Context Release Request to MME with cause value set to "Redirection towards 1xRTT"); the net outcome optimizes 1xCSFB call setup latency. Note that strictly speaking the eNB should respond to the Initial Context Setup Request with CSFB Indicator from MME with an Initial Context Setup Failure message for a UE with dual receiver since the 3GPP prior-art callflow is meant for DRx UEs not SRx UEs.

Second, the eNB 204a records the "UE type" PCMD field as "Single Receiver" rather than "Dual Receivers" for the UE such that both statistical and per-call analyses in post processing have the correct UE type info. Third, if the optional ueCapabilityInfo is absent, the eNB 204a skips steps 224 and 226 (this round trip of messaging allows eNB 204/204a to obtain the UE Capability Info from UE directly, eNB 204a then sends the info to MME for caching which is not shown in FIG. 2). The eNB 204a also pegs the "UE type" PCMD field with a value of "Unknown at this time". Whether the UE is actually a DRx UE or SRx UE will become known later on when UE makes a Packet Data call (which uses a callflow similar to FIG. 2) resulting in the UE Capability becoming known to the eNB and also cached at the MME. Once cached, MME will provide the ueCapabilityInfo to eNB when the UE subsequently makes 1xCSFB calls, allowing the "UE type" PCMD field to be pegged accordingly for each 1xCSFB call. During post processing, the previous set of PCMD records for the 1xCSFB call where the UE type was "Unknown at this time" and subsequent sets of PCMD records where the UE type is "SRx UE" (or "DRx UE") can be correlated via the UE's IMSI (International Mobile Station Identifier) field in the PCMD set.

In yet another embodiment, call setup latency time can be further reduced by optimization actions in the MME in response to the "CSFB Indicator" of Extended Service Request 216/218. Rather than (pre)allocating bearer and other resources for the UE in the LTE network and performing message exchange and coordination with SGW/PGW, steps unnecessary to perform the final PS suspension actions are skipped or simplified in order to send the Initial Context Setup Request (CSFB Indicator, ueCapabilityInfo) message to eNB as soon as possible.

Figure 4:
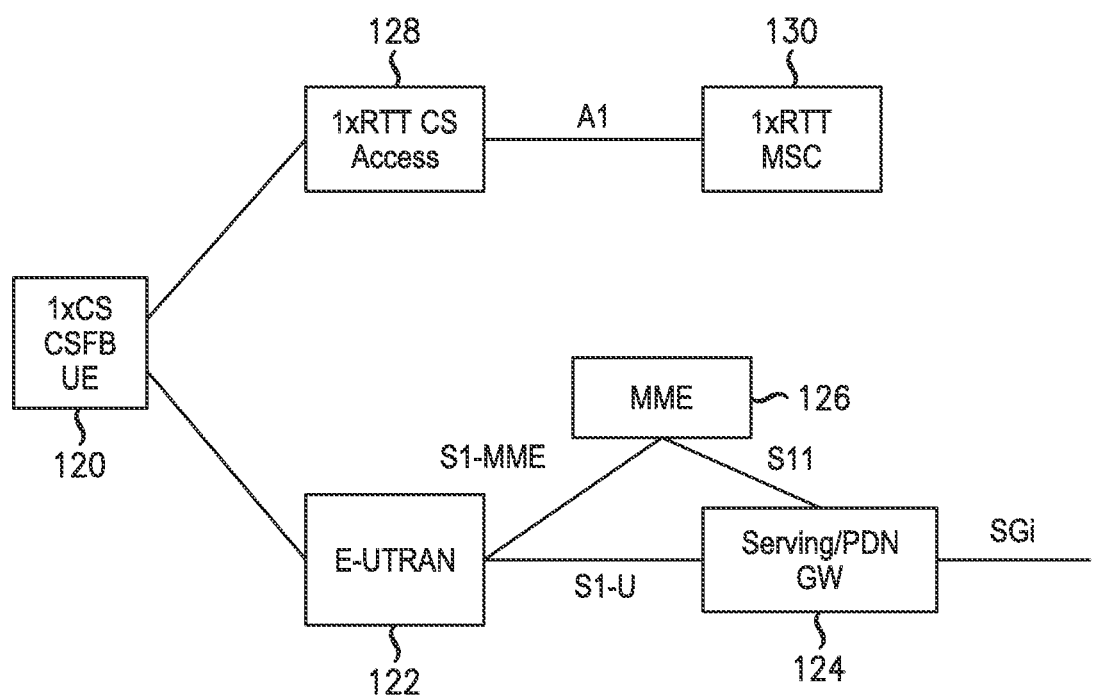
FIG. 4 is a block diagram illustrating an architecture for implementing CSFB according to the present invention.

An apparatus for use with the above embodiments is shown in FIG. 4. A DRx or SRx UE 120 capable of CSFB can be registered with both an LTE network through E-UTRAN 122 and a 1xRTT network through access device 128 at the same time. Access device 128 is connected to 1xRTT MSC 130 (Mobile Switching Center) as understood by one of ordinary skill in the art. E-UTRAN 122 is coupled to MME 126 and Serving/PDN Gateways 124 for the purposes of communicating on an LTE network.

The apparatus in FIGS. 1 and 4 in one example comprises a plurality of components such as one or more of electronic components, hardware components, and computer software components. A number of such components can be combined or divided in the apparatus. An example component of the apparatus employs and/or comprises a set and/or series of computer instructions written in or implemented with any of a number of programming languages, as will be appreciated by those skilled in the art.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A method for reducing call setup latency in an LTE network comprising the steps of:
    broadcasting an indicator that an eNB supports Circuit Switched Fall Back (CSFB) for dual receiver user equipment (DRx UE);
    receiving a message requesting connection to a voice-centric call processing network from a user equipment (UE), the message comprising a payload including at least a CSFB indicator;
    forwarding the payload to a mobility management entity (MME);
    receiving, from the MME, a request message that comprises the CSFB indicator;
    sending a connection release to the UE without exchanging any further messages with the UE; and
    returning a UE Context Release Request to the MME with an indicator that the UE is accessing the voice-centric call processing network, without sending an expected response message in response to the request message from the MME.

2. The method of claim 1 wherein the voice-centric call processing technology is 1xRTT.

3. The method of claim 1 wherein the method steps are executed by the eNB.

4. The method of claim 1 further comprising the step, executed by the MME, of performing PS (Packet Service) Suspension in response to the UE Context Release Request.

5. The method of claim 1 wherein the message from the MME is an Initial Context Setup Request and further comprises a field for ueCapabilityInfo.

6. The method of claim 1 wherein the UE is a SRx (Single Receiver) UE.

7. The method of claim 1 wherein the UE is a DRx (Dual-Receiver) UE.

8. The method of claim 1 further comprising the step of providing Per Call Measurement Data (PCMD) to the MME.

9. A method for reducing call setup latency in an LTE network, said method executed by an eNodeB (eNB) and comprising the steps of:
    broadcasting an indicator that the eNB supports CSFB for dual receiver UEs;
    receiving an Uplink (UL) Info Transfer message requesting connection to a 1xRTT network from a user equipment (UE), the message comprising a payload including at least a CSFB indicator;
    forwarding the payload to a mobility management entity (MME) in a Initial UE Message;
    receiving, from the MME, an Initial Context Setup Request that comprises at least the CSFB indicator and optional UE capability information;
    sending a Radio Resource Control (RRC) Connection Release to the UE without exchanging any further messages with the UE; and
    returning a UE Context Release Request to the MME with an indicator that the UE is redirected toward 1xRTT, without replying with an Initial Context Setup Response or Initial Context Setup Failure to the MME in response to the Initial Context Setup Request from the MME.

10. The method of claim 9 further comprising the step, executed by the MME, of performing PS (Packet Service) Suspension in response to the UE Context Release Request.

11. The method of claim 9 wherein the UE is a SRx (Single Receiver) UE.

12. The method of claim 9 wherein the UE is a DRx (Dual Receiver) UE.

13. An apparatus for use in an LTE network for reducing call setup latency using an eNB, said apparatus configured to perform the following steps:
   broadcasting an indicator that an eNB supports Circuit Switched Fall Back (CSFB) for dual receiver user equipment (DRx UE);
   receiving a message requesting connection to a voice-centric call processing network from a user equipment (UE), the message comprising a payload including at least a CSFB indicator;
   forwarding the payload to a mobility management entity (MME);
   receiving, from the MME, a request message that comprises the CSFB indicator;
   sending a connection release to the UE without exchanging any further messages with the UE; and
   returning a UE Context Release Request to the MME with an indicator that the UE is accessing to the voice-centric call processing network, without sending an expected response message in response to the request message from the MME.

14. The apparatus of claim 13 wherein the voice-centric call processing technology is 1xRTT.

15. The apparatus of claim 13 wherein the method steps are executed by the eNB.

16. The apparatus of claim 13 further comprising the step, executed by the MME, of performing PS (Packet Service) Suspension in response to the UE Context Release Request.

17. The apparatus of claim 13 wherein the message from the MME is an Initial Context Setup Request and further comprises a field for ueCapabilityInfo.

18. The apparatus of claim 13 wherein the UE is a SRx (Single Receiver) UE.

19. The apparatus of claim 13 wherein the UE is a DRx (Dual Receiver) UE.

20. The apparatus of claim 13 further comprising the step of providing Per Call Measurement Data (PCMD) to the MME.

* * * * *